United States Patent [19]
Rothschild

[11] Patent Number: 4,848,394
[45] Date of Patent: Jul. 18, 1989

[54] GAS CARTRIDGE

[75] Inventor: Bertram P. Rothschild, Johannesburg, South Africa

[73] Assignee: N B Marketing Company (Proprietary) Limited, Johannesburg, South Africa

[21] Appl. No.: 47,484

[22] Filed: May 11, 1987

[30] Foreign Application Priority Data

May 13, 1986 [ZA] South Africa ........................ 86/3527

[51] Int. Cl.[4] ................................................ F16K 43/00
[52] U.S. Cl. ...................................... 137/322; 251/144
[58] Field of Search .......................... 251/144; 137/322

[56] References Cited

U.S. PATENT DOCUMENTS 231,997 9/1880 Chamberlain ........................ 137/322
3,290,000 12/1966 Snyder ................................ 137/322
4,354,523 10/1982 Hochmuth et al. .................. 137/322

FOREIGN PATENT DOCUMENTS 1010681 11/1965 European Pat. Off. .
0166826 1/1986 European Pat. Off. .
1355712 2/1964 France ................................ 137/322
2111646 7/1983 United Kingdom .
2183312 6/1987 United Kingdom .

*Primary Examiner*—A. Michael Chambers
*Attorney, Agent, or Firm*—Armstrong, Nikaido, Marmelstein, Kubovcik & Murray

[57] ABSTRACT

A valve mechanism (2) for a re-fillable gas cartridge (1) comprising a body member (3) having a passage therethrough and adapted to engage in the neck of the cartridge. The passage comprises first and second bores (5, 6) extending from opposite ends of the body member and meeting at a step, the first bore having a diameter less than that of the second bore, the step defining a tapered valve seat (8). A valve member (10) having a head (**10*a*) and a stem (10*b*) projecting therefrom is provided which is located in the passage so that the head of the valve member sealingly seats on the tapered valve seat with the stem located in the first bore. Means (11**) are provided for biassing the valve member into its sealing postion.

7 Claims, 2 Drawing Sheets

2
3
4
6
10
10b
10c
10a 11
12
16b
16a
16
(B)

10a
(A)
10b
10c
10

GAS CARTRIDGE

BACKGROUND TO THE INVENTION

This invention relates to a gas cartridge or cylinder of the type which is used to charge a vessel with gas. The invention more particularly relates to a valve mechanism for a re-fillable gas cartridge or cylinder of this type.

One kind of vessel which is charged by means of a gas cartridge is commonly referred to as a soda siphon. However, the gas cartridges with which the invention is concerned are not intended exclusively for use on soda siphons. They may also be used in association with a carbonating head for carbonating the contents of a conventional plastics beverage container, commonly known as a PET bottle. The gas cartridges of the invention are also not confined to the generation of carbonated water. In some applications they are used for the manufacture of whipped cream and similar confections.

The gas cartridges of the invention may furthermore be used for charging play guns which are used to a growing extent in games in which participants fire paint filled gelatine capsules at one another.

It is known to employ gas cartridges of the aforementioned kind which are re-chargeable for repeated use. Such cartridges require a valve mechanism. One such valve mechanism has a rubber washer which is used to create a seal between a valve head of the mechanism and a valve seat. The rubber washer has not, however, proved to be entirely satisfactory. With repeated use, the rubber washer may become distorted, which may affect its sealing ability. Because of the very high pressure in the gas cartridge, usually of the order of 1000 to 12000 psi, the rubber washer may also display a tendency to extrude past the valve seat, which can lead to the destruction of the washer. It has also been found that the rubber washer does not always lift clearly off the valve seat when the valve mechanism is opened,- with the result that an unimpeded discharge of gas from the cartridge is not obtained. In order to improve the gas discharge, a slot has been provided in the valve plunger carrying the valve head but this requires an additional machining operation on the valve plunger which adds to its cost.

It is accordingly an object of the invention to provide a valve mechanism for a re-fillable gas cartridge with which the abovementioned disadvantages are at least diminished.

SUMMARY OF THE INVENTION

According to the invention a valve mechanism for a re-fillable gas cartridge comprises a body member having a passage therethrough and adapted to engage in the neck of the cartridge, the passage comprising first and second bores extending from opposite ends of the body member and meeting at a step, the first bore having a diameter less than that of the second bore, the step defining a tapered valve seat, a valve member having a head and a stem projecting therefrom located in the passage so that the head of the valve member sealingly seats on the tapered valve seat with the stem located in the first bore, and means for biassing the valve member into its sealing position.

The head is preferably radiused where it contacts the valve seat. Alternatively, the head may be semi-spherical with the stem projecting from the apex of the head. The valve member is preferably made of plastics material such as nylon.

The means for biassing the valve member into its sealing position may be a coil spring located in the second bore and bearing on the head of the valve member. The body member may be deformed, for example swaged or crimped, to trap the coil spring in the second bore.

The valve member, which is preferably threadedly engaged in the neck of the cartridge,preferably includes a washer located in the second bore between the core spring and the deformed part of the body member.

The invention also provides a gas cartridge having a valve mechanism as hereinabove defined engaged in the neck of the cartridge.

Preferred embodiments of the invention will now be described by way of example with reference to the accompanying drawings in which;

BRIEF DESCRIPTION TO DRAWINGS

DESCRIPTION OF THE PREFERRED EMBODIMENTS

Figure 2:
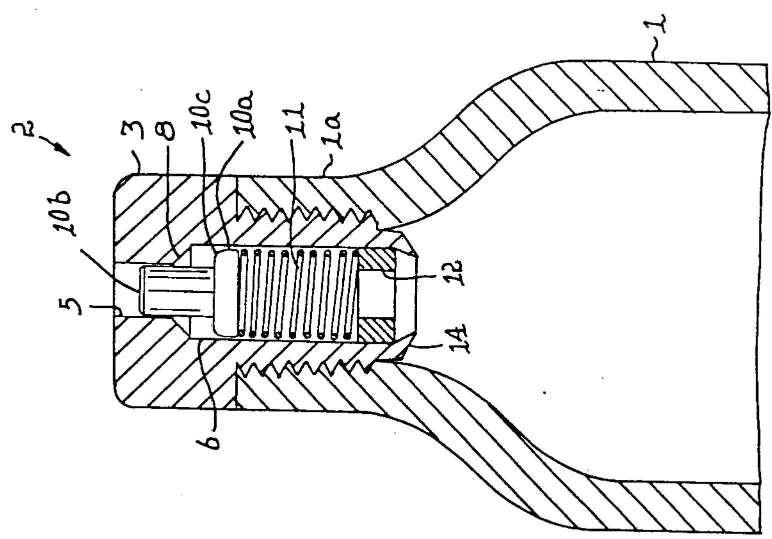
FIG. 2 is a similar view of the cartridge showing the valve mechanism in an open position.

The parts shown in the drawings are approximately five times their actual size.

A gas cartridge 1 made of steel has a narrowed neck 1*a* which is internally threaded. A valve mechanism 2 is fitted in the neck 1*a* of the cartridge.

The valve mechanism comprises a body member 3 having a threaded shank 4 which engages the thread in the neck 1*a* of the cartridge. The body member 3 has a passage through it consisting of a first bore 5 and a second bore 6. The first and second bores 5, 6 extend from opposite ends of the body member 3 and the diameter of the first bore 5 is less than that of the second bore 6. The first and second bores 5, 6 meet at a step which defines a tapered valve seat 8.

The first and second bores 5, 6 together with the valve seat 8 may be formed in the body member 3 in a single operation using a conventional drill bit having different diameters along its length.

A valve member 10 which has a head 10*a* and a stem 10*b* projecting therefrom is disposed in the passage through the body member 3 so that the head 10*a* sealingly seats on the valve seat 8 and the stem 10*b* is located in the first bore 5.

Because of the high pressure which the valve mechanism 2 must withstand, it is essential to maintain the finest possible line contact between the heat 10*a* of the valve member and the valve seat 8. However, the stem 10*b* of the valve member cannot be a tight fit in the first bore 5, because it must allow for the passage of pressurized gas. This allows movement of the valve member, which can frustrate the fine line contact which is required. In order to overcome this problem, the head 10*a* is radiussed as indicated by numeral 10*c* in the region where it contacts the valve seat 8 to ensure fine line contact and hence a proper seal between the head and the seat.

A coil spring 11 is located in the second bore 6 and bears on the head 10*a* of the valve member 10 to bias it into its sealing position. The coil spring extends between the valve member 10 and a washer 12 located in the second bore 6. In this embodiment of the invention, the body member 3 of the valve mechanism is swaged or crimped at its lower end as indicated by numberal 14 to trap the washer 12 and hence the coil spring 11 in the second bore 6.

The valve member 10 is preferably made of a suitable plastics material such as nylon. The nylon may be provided in rods which are cut into desired lengths and thereafter machined to provide their required profile. Alternatively, the valve member may be made by injection moulding.

Figures 3, 4:
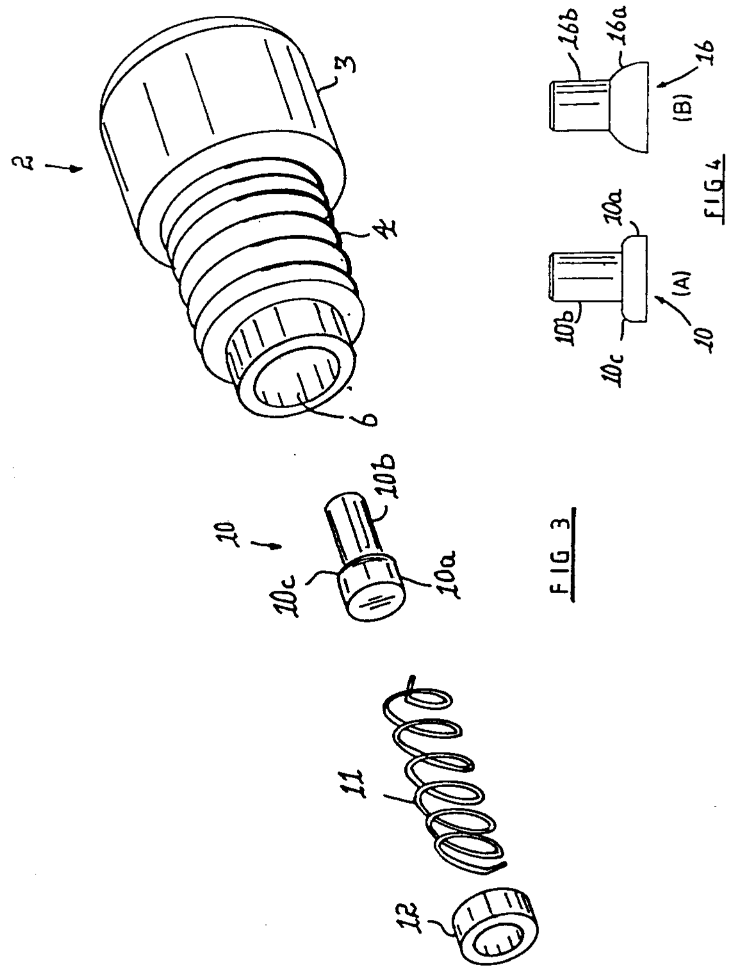
FIG. 3 is an exploded perspective view of the valve mechanism.
FIG. 4 are elevations of two alternative forms of valve members used in the valve mechanism.

An alternative form of valve member 16 is shown in FIG. 4(B) in which the head 16*a* of the valve member is semi-spherical with the stem 16*b* projecting from the apex of the head. This valve member provides a proper seal in the same manner as the valve member 10.

Figure 1:
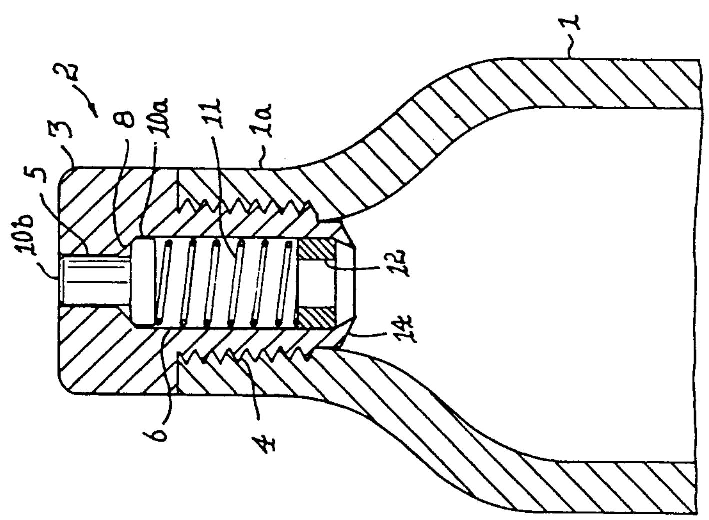
FIG. 1 is a section through the upper part of a gas cartridge carrying a valve mechanism according to the invention in its closed position.

In the closed position of the valve mechanism 2 shown in FIG. 1, gas under pressure in the cartridge 1 is prevented from being discharged. When the cartridge is applied in conventional manner to the receiving socket (not shown) of a soda siphon, carbonating head or other device, a pin (not shown) in the siphon, carbonating head or device acts on the stem 10*b* of the valve member 10 and displaces it to the position shown in FIG. 2. This lifts the valve member off the valve seat 8 and permits gas to flow through the passage in the body member 3. For this purpose, a sufficient clearance is provided between the stem 10*b* and the first bore 5.

The cartridge 1 may be re-filled numerous times without affecting the efficient operation of the valve mechanism 2. During filling, the cartridge 1 is applied to a conventional filling head (not shown) and gas is forced into the first bore 5 of the valve mechanism and past the valve member 10.

Many other embodiments of the invention may be made differing in matters of detail only from those described above and without departing from the scope of the invention as defined in the appended claims.

I claim:

1. A valve mechanism operable as a high pressure sealing device between the high pressure of a re-fillable gas cartridge and atmosphere comprising a body member having a passage therethrough and adapted to engage in the neck of the cartridge, the passage including first and second bores extending from opposite ends of the body member and meeting at a step, the first bore having a diameter less than that of the second bore, the step defining a tapered valve seat, a valve member made of a plastic material and having a head, a stem projecting from said head and located in the passage so that the head of the valve member sealingly seats directly on the tapered valve seat with the stem located guidingly in the first bore, the head of the valve member being radiused where it contacts the valve seat, and means for biasing the valve member into a sealing position with the radiused head of the valve member forming a line contact with said valve seat to provide an effective high pressure seal.

2. A valve mechanism as claimed in claim 1 in which the head of the valve member is semi-spherical with the stem projecting from the apex of the head.

3. A valve member as claimed in claim 1 in which the means for biassing the valve member into its sealing position is a coil spring located in the second bore and bearing on the head of the valve member.

4. A valve member as claimed in claim 3 in which the body member is deformed to trap the coil spring in the second bore.

5. A valve member as claimed in claim 4 including a washer located in the second bore between the coil spring and the deformed part of the body member.

6. A valve member as claimed in claim 1 in which the body member is threadedly engaged in the neck of the cartridge.

7. A re-fillable gas cartridge having a neck and a valve mechanism operable in the neck of the cartridge as a high pressure sealing device between the high pressure of the cartridge and atmosphere wherein said valve mechanism comprises a body member having a passage therethrough and adapted to engage in the neck of the cartridge, the passage including first and second bores extending from opposite ends of the body member and meeting at a step, the first bore having a diameter less than that of the second bore, the step defining a tapered valve seat, a valve member made of a plastic material and having a head, a stem projecting from said head and located in the passage so that the head of the valve member sealingly seats directly on the tapered valve seat with the stem located guidingly in the first bore, the head of the valve member being radiused where it contacts the valve seat, and means for biasing the valve member into a sealing position with the radiused head of the valve member forming a line contact with said valve seal to provide an effective high pressure seal.

* * * * *